Nov. 30, 1965    G. S. HARTLEY    3,220,802
SEPARATION OF SOLUTES BY LIQUID-LIQUID EXTRACTION
Filed Oct. 5, 1960    2 Sheets-Sheet 1

INVENTOR
Gilbert Spencer Hartley
by Wenderoth, Lind & Ponack
ATTORNEYS

Nov. 30, 1965 G. S. HARTLEY 3,220,802
SEPARATION OF SOLUTES BY LIQUID-LIQUID EXTRACTION
Filed Oct. 5, 1960 2 Sheets-Sheet 2
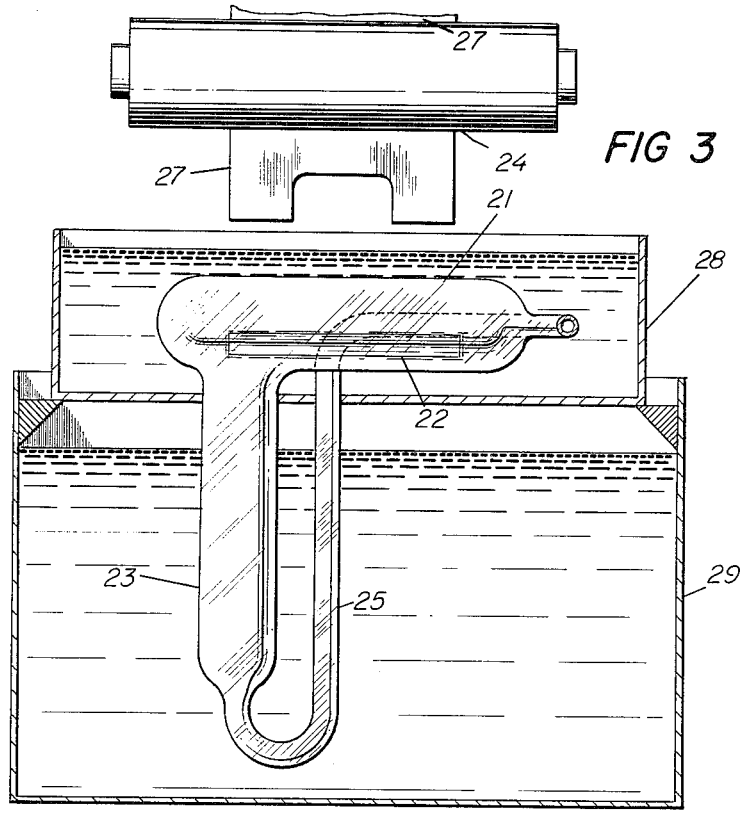
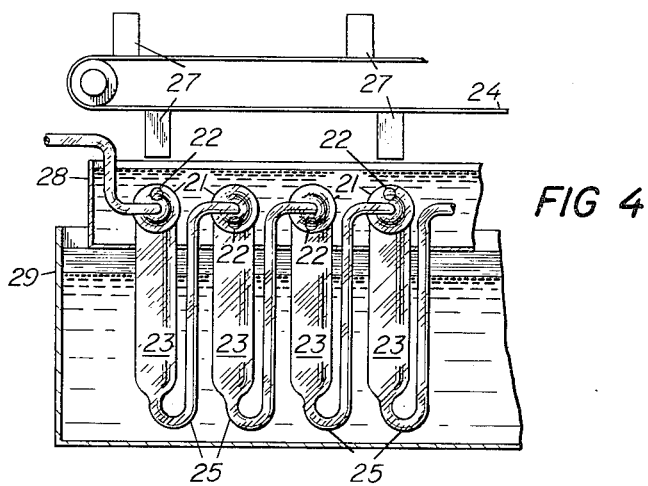
INVENTOR
Gilbert Spencer Hartley
ATTORNEYS

United States Patent Office 3,220,802
Patented Nov. 30, 1965

3,220,802
SEPARATION OF SOLUTES BY LIQUID-LIQUID
EXTRACTION
Gilbert S. Hartley, Fulbourn, England, assignor to Fisons
Pest Control Limited, Harston, England
Filed Oct. 5, 1960, Ser. No. 60,703
Claims priority, application Great Britain, Oct. 6, 1959,
33,762/59
8 Claims. (Cl. 23—267)

This invention relates to an improved method and apparatus for the separation of solutes by partition.

The technique of partition chromatography is widely used in analytical chemistry to separate dissolved substances of similar chemical constitution. It consists essentially of allowing one solvent to flow successively past a large number of separate portions of an immiscible second solvent sufficiently slowly for diffusive equilibrium to be reached at each place where the solvents are in contact. To hold the numerous small separate portions of "standing" solvent in position, they are usually arranged to be present between the interstices of a column of inert finely divided solid. The moving solvent flows slowly through this column. If a mixture of dissolved substances is introduced at the top of the column, and if they have equilibrium partition coefficients between the two solvents which slightly differ, the solutes are separated as they pass down the column and appear in the outflowing solvent, if concentration is plotted against time, in separate zones.

This device is generally satisfactory for separation of the very small quantities which are normally sufficient for analytical purposes, but if the device is to be called upon to separate larger amounts which may be required for other purposes the column has to be inconveniently large. If it is made of greater diameter it is extremely difficult to arrange uniform flow down it.

In order to obtain separation of larger quantities, another application of the same principle is to cause the moving solvent to flow successively through a series of separate units comprising connected mixing vessels which are mainly filled with the standing solvent. If the standing solvent is heavier than the moving solvent the latter is led into the bottom of each vessel and out at the top. Successful separation necessitates rapid exchange of solutes, according to the partition ratios, between the two solvents in every vessel. In the column as used for analysis this is arranged by having the discrete solvent portions so small that pure diffusion ensures rapid exchange. When larger portions of the said solvents are used in every stage they must be thoroughly agitated together in each vessel. Several devices have been suggested to provide the required conditions in a convenient manner, one of which is described in U.S. Patent 2,895,808.

It has now been found that the necessary rapid exchange of solutes between the two solvents can be obtained if, in each unit, the two immiscible solvents are brought temporarily to a temperature at which they are of mutually increased miscibility.

The principle of the present invention depends on the fact that there are many pairs of liquids which are incompletely miscible over a certain temperature range and completely miscible over another. Methanol and n-heptane for example are completely miscible above 54° C. but only partly so at lower temperatures. Water and triethylamine on the other hand are completely miscible below 18° C. but only partly so above this temperature. If such pairs of liquids are used and the apparatus is adapted so that the mixing vessels and the connecting tubes can be maintained at different temperatures, it is possible for the solution to be homogeneous while mixing occurs and to separate into two phases in the connecting tube.

Accordingly the present invention is concerned with a method of separating solutes dissolved in a first liquid solvent by intimately contacting the first solvent with a second solvent only partly miscible with the first at an accessible temperature and of different specific gravity which comprises passing one of the solvents continuously through a series of mixing vessels each of which contains mainly the other solvent and is preferably substantially completely filled with solvent, and agitating the contents of each vessel by means of at least one loose body which is caused to move in each vessel and at the same time maintaining the agitated solvents at a temperature at which they are miscible with each other or of increased miscibility, the moving solvent passing from one mixing vessel to another through tubes maintained at a temperature at which liquid-liquid separation takes place or mutual miscibility of the solvents becomes less, the tubes being so designed that only one phase is transferred from each mixing vessel to the next.

The present invention also provides an apparatus essentially for laboratory scale use which comprises a number of mixing vessels, each vessel being provided with an inlet tube and an outlet tube and containing at least one loose body, means for causing the loose bodies to move, and means for maintaining the mixing vessels at a temperature different from that of the outlet tubes, wherein the outlet tube from each mixing vessel is of a diameter adapted to permit separation therein of the liquid phases, the outlet tube from one vessel being connected to the inlet tube of the next vessel except in the case of the first and last vessels in the apparatus.

The means for maintaining the mixing vessels at a temperature different from that of the outlet tubes may comprise means for heating either the mixing vessels or the outlet tubes together with means for cooling the unheated parts of the apparatus. The means for heating and the means for cooling are preferably water or oil baths in one of which the mixing vessels are contained and in the other of which the outlet tubes are contained, one of the two baths being maintained at an upper temperature and the other at a lower temperature. Any conventional means may be employed to keep the two baths at their respective temperatures.

Alternative means for heating include electrical, radiant heat or ultrasonic means. Means for cooling may be conventional or by a forced draught of cool air such as is supplied by a fan.

In order to facilitate heat transfer the mixing vessels or the outlet tubes may be provided with metal inserts or fins.

In the preferred embodiment of the invention the mixing vessels are cylindrical, made of glass and lie substantially horizontal. Furthermore the outlet tubes are also cylindrical and extend upwardly from the mixing vessels at a slight angle to the vertical.

The agitation in each mixing vessel may be effected by employing as the loose bodies in the mixing vessels magnetisable rods, each of which is suitably sealed in a glass, plastic or like sheath and is caused to move by a fluctuating magnetic field obtained for instance by means of fixed electromagnets which can be magnetised periodically or by moving permanent magnets. When the fluctuating magnetic field is obtained by means of fixed electromagnets, these are operated through a rectifier and commutator so that they are energized and de-energized on an externally controlled time scale. When the fluctuating magnetic field is obtained by means of moving permanent magnets, this may be obtained, for example, by arranging the magnets on a continuous belt, the lower tract of which moves closely above and across the mixing vessels.

The outlet tube from one vessel may be joined at its upper end to the inlet tube of the succeeding vessel. The inlet tube to one vessel may also be sealed through the wall of the outlet tube of the previous vessel somewhere along its length and terminate therein as an open ended tube in the vicinity of the topmost part of the outlet tube. In this version of the apparatus the outlet tube may be provided with a stopper at its topmost part so that the contents of the tube may be drained by a flexible pipette if desired.

According to a preferred embodiment of the invention the inlet tubes are of relatively narrow bore, for example not more than 3 millimetres diameter, so that when most ordinary liquids are passed through them for the first time there is no tendency for discrete air bubbles to be trapped. The outlet tubes are preferably of increased diameter so that there is therein a slower linear flow thus assisting the separation of the liquids.

In those cases where it is desired that a lighter liquid flows from one vessel to the next the outlet ascends from the mixing vessel; in those cases where it is desired that a denser liquid flows from one vessel to the next the apparatus is inverted so that the outlet tube descends from the mixing vessel. In the latter case, when the means for heating or cooling the mixing vessels is a water or oil bath, it is convenient for the outlet tubes to project through the bottom of the bath into another heated or cooled water or oil bath. The topmost part of the outlet tubes are not in this case provided with stoppers, the latter function being transferred to stub tubes projecting upwards above the surface of the top liquid in line with the outlet tubes so that a pipette can be inserted to the bottom of the latter.

Two embodiments of the invention are shown solely by way of illustration in the accompanying drawings.

FIGURE 3 is a side elevation of another embodiment of the apparatus according to the present invention.

FIGURE 4 is a front elevation on a reduced scale of the apparatus illustrated in FIGURE 3.

Figure 1:
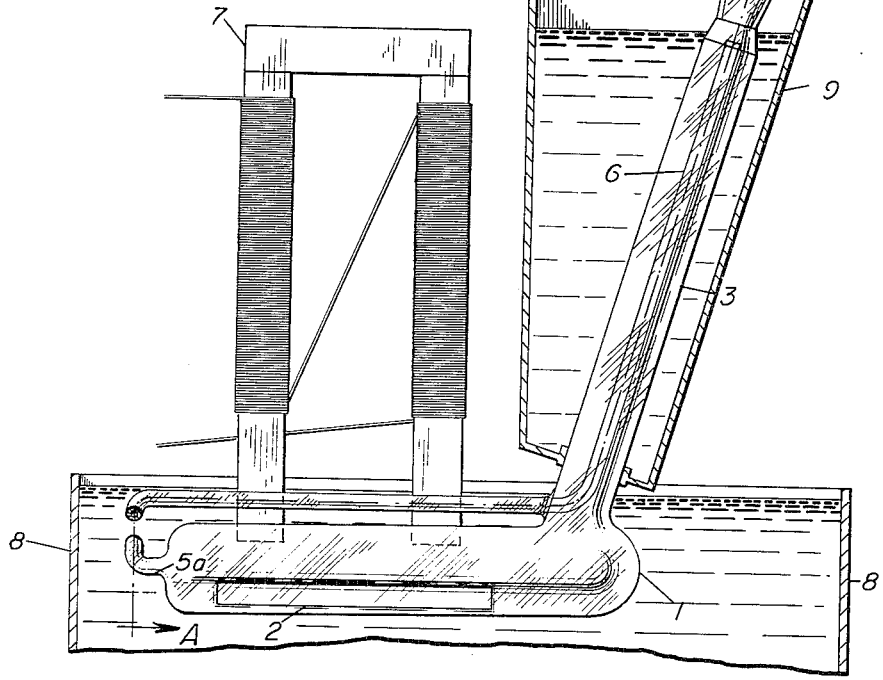
FIGURE 1 is a side elevation drawing of one embodiment of the apparatus according to the present invention.

The apparatus comprises a series of cylindrical glass mixing vessels 1, each vessel containing one or more soft iron rods 2, enveloped in a sheath of, for example polytetrafluoroethylene. Near one end of the mixing vessel 1 is a glass outlet tube 3 which extends upwardly from the top surface of the mixing vessel. The end of the tube is closed by a stopper 4. From FIGURE 2 of the drawings it is apparent that outlet tube 3 is connected to the inlet tube 5 of another unit as illustrated in FIGURE 1 by lead tube 6. To avoid confusion the inlet tube in FIGURE 1 is labelled 5a. The lead tube 6 is conveniently housed internally of outlet tube 3 and terminates just short of the base of the stopper 4 so that the minimum of air is trapped when the apparatus is filled.

The soft iron rods 2 are caused to move under the influence of a varying magnetic field induced by electromagnets 7.

The mixing vessels 1 are immersed in water contained in a water bath 8. The outlet tubes 3 are immersed in a further water bath 9. The water contained in one of the two baths is heated and the other one is cooled. Conventional temperature control and agitation is provided in both baths.

Figure 2:
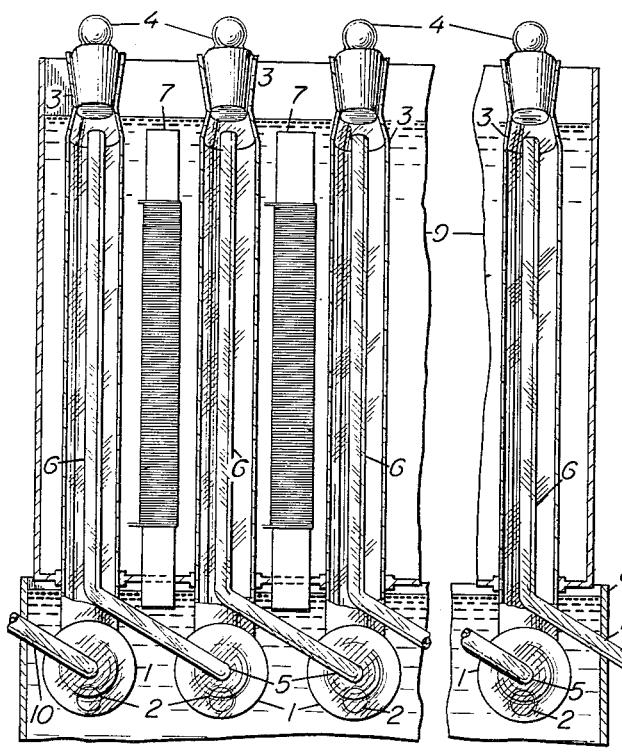
FIGURE 2 is a cross section along line A—A of FIGURE 1.

The end tube 10 shown in FIGURE 2 is connected to a source of one of the solvents and end tube 11 leads to an outer reservoir or a battery of collecting tubes as is generally used in chromatographic practice.

In order to fill the apparatus the heavier solvent is first introduced into the series of vessels through tube 10, the air in the vessels being for the most part displaced during this operation. Starting at the end nearest tube 10, which is temporarily sealed, stopper 4 of each mixing vessel is removed and a proportion of the heavy solvent removed and the lighter solvent substituted. Another convenient method of filling the apparatus comprises forming a mixture of the solvents at a temperature at which they are miscible and filling the apparatus with this one-phase mixture, while maintaining the apparatus throughout at a temperature at which separation does not occur. Other methods for filling the apparatus are also available such as is described in U.S. Patent No. 2,895,808.

It is necessary to ensure that the solvents are free from dissolved gases before entering the apparatus since these gases can cause obstruction if they come out of solution during the passage of the solvent through the apparatus. Solvents free of dissolved gases can be obtained by using as a source of the solvent a container of the solvent heated under reflux.

In operation, a slow current of the light solvent is passed through the vessels contacting in turn the heavy solvent contained in the various mixing vessels, the heavy solvent containing the solutes. In each of the mixing vessels 1 the two solvents are maintained at a temperature at which they form a substantially homogeneous solution which passes from the mixing vessel 1 to the outlet tubes 3. Here the solution is brought to a temperature at which separation occurs, the lighter solvent passing through lead tube 6, the heavier solvent returning back to the mixing vessel.

During the whole operation the stirring rods 2 are caused to oscillate in the mixing vessels 1 under the influence of the varying magnetic field induced by the electromagnets 7. The left hand lead tube 10 is connected to a source of supply of the light solvent preferably containing a proportion of the other solvent up to the limit of miscibility of the two solvents. The right hand lead tube 11 goes to a reservoir or a battery of collecting tubes as is generally used in chromatographic practice.

The apparatus illustrated in FIGURES 3 and 4 comprises a series of cylindrical glass mixing vessels 21, each vessel containing a soft iron rod 22 enveloped in a sheath of polytetrafluoroethylene. Near one end of the mixing vessel 21 is a glass outlet tube 23 which extends downwardly from the bottom surface of the mixing vessel. From FIGURE 4 of the drawings it is apparent that the outlet tube 23 is connected to the inlet tube 25 of the next mixing vessel.

The soft iron rods 22 are caused to virbrate under the influence of permanent magnets 27. These permanent magnets are attached to a continuous belt 24 which is driven by a motor not shown.

The mixing vessels 21 are immersed in water contained in a water bath 28. The outlet tubes 23 are immersed in a further water bath 29. The water contained in one of the baths is heated and the other one is cooled. Conventional temperature control and agitation is provided in both baths.

The apparatus illustrated in FIGURES 3 and 4 is operated in the same manner as the apparatus illustrated in FIGURES 1 and 2 except that the heavy solvent is, in this case, the moving solvent.

The present invention discloses a process for carrying out the separation of two or more solutes from a common solvent, which has several advantages over operation under isothermal conditions as described in U.S. Patent No. 2,895,808.

Firstly, equilibration is more rapid in the mixing vessels in the one-phase system than in a two-phase system, so that greater speed of operation and/or less violent agitation with consequent reduction of mechanical wear can be obtained. Secondly, a much smaller ratio of moving separated phase to standing phase can be used, which enables better separations to be obtained of solutes partitioning favourably to the moving phase. The advantage of this is increased speed of operation, since the carrier-favourable solutes are removed first, and/or useful operation over a wider range of partition co-efficients. The reason for this advantage is that, where equilibration between two phases must be attained in the mixing vessels, a large fraction of the volume of the outlet tube must be occupied by carrier phase in order to retain enough in the mixing vessel and to provide sufficient time for breaking of the transient emulsion in the outlet tube. In the system of the present invention, mixing of the inflowing carrier phase is completed almost instantaneously as it enters the mixing vessel and separation can only occur in the outlet tube. When it does occur, separation is more satisfactory than in the isothermal system because droplets of either separated phase are always growing at the expense of their surroundings. Consequently no very small drops can survive, whereas in the isothermal system they frequently do so resulting in both unwanted mechanical carry-over of standing phase and unwanted retention of carrier phase in the walls of the vessel. This latter mechanism, while contributing to the second advantage mentioned, also is itself an independent advantage since the unwanted carry-over or retention referred to is detrimental to efficiency of separation whatever phase ratio is used.

It is, of course, practicable for the apparatus of the present invention to be used isothermally.

I claim:

1. An apparatus comprising an oscillating means, two zones each having means for maintaining the respective zone at a temperature different from the temperature of the other zone and a number of substantially horizontally disposed mixing vessels, each vessel being provided with a substantially vertically disposed inlet tube and a substantially vertically disposed outlet tube, each of said outlet tubes extending from its respective mixing vessel in substantially the same direction and each of said vessels containing at least one loose magnetizable body, connections between the vessels consisting of the outlet tube from one vessel being connected to the inlet tube of the next vessel, said outlet tube having a greater cross-sectional area than said inlet tube, the mixing vessels being enclosed in one of the zones and the outlet tubes being enclosed in the other zone and said oscillating means comprising a series of fixed electromagnets, means coupled to said electromagnets for periodically magnetizing them, and said electromagnets being external to but in close proximity to the mixing vessel to move each of the loose magnetizable bodies in the mixing vessels.

2. An apparatus comprising an oscillating means, two zones each having means for maintaining the respective zone at a temperature different from the temperature of the other zone and a number of substantially horizontally disposed mixing vessels, each vessel being provided with a substantially vertically disposed inlet tube and a substantially vertically disposed outlet tube, each of said outlet tubes extending from its respective mixing vessel substantially in the same direction and each of said vessels containing at least one loose magnetizable body, connections between the vessels consisting of the outlet tube from one vessel being connected to the inlet tube of the next vessel, said outlet tube having a greater cross-sectional area than said inlet tube, the mixing vessels being enclosed in one of the zones and the outlet tubes being enclosed in the other zone and said oscillating means comprising a number of permanent magnets arranged on a continuous belt, means for moving said belt alongside the mixing vessels and said permanent magnets being external to but in close proximity to the mixing vessels to move each of the loose magnetizable bodies in the mixing vessels.

3. An apparatus comprising an oscillating means, two baths each having means therein for maintaining the bath at a temperature different from the temperature of the other bath and a number of substantially horizontally disposed mixing vessels, each vessel being provided with a substantially vertically disposed inlet tube and a substantially vertically disposed outlet tube, each of said outlet tubes extending from its respective mixing vessel substantially in the same direction and each of said vessels containing at least one loose magnetizable body, connections between the vessels consisting of the outlet tube from one vessel being connected to the inlet tube of the next vessel, said outlet tube having a greater cross-sectional area than said inlet tube, the mixing vessels being contained in one of the baths and the outlet tubes being contained in the other bath, and said oscillating means comprising a series of fixed electromagnets, means coupled to said electromagnets for periodically magnetizing them, and said electromagnets being external to but in close proximity to the mixing vessels to move each of the loose magnetizable bodies in the mixing vessels.

4. An apparatus comprising an oscillating means, two baths, each having means therein for maintaining the bath at a temperature different from the temperature of the other bath, and a number of substantially horizontally disposed mixing vessels, each vessel being provided with a substantially vertically disposed inlet tube and a substantially vertically disposed outlet tube, said outlet tubes extending from its respective mixing vessel in substantially the same direction and each of said vessels containing at least one loose magnetizable body, connections between the vessels consisting of the outlet tube from one vessel being connected to the inlet tube of the next vessel, said outlet tube having a greater cross-sectional area than said inlet tube, the mixing vessels being contained in one of the baths and the outlet tubes being contained in the other bath, and said oscillating means comprising a number of permanent magnets arranged on a continuous belt, means for moving said belt alongside the mixing vessels and said permanent magnets being external to but in close proximity to the mixing vessels to move each of the loose magnetizable bodies in the mixing vessels.

5. An apparatus comprising an oscillating means, two baths, each having means therein for maintaining the bath at a temperature different from the temperature of the other bath, and a number of substantially horizontally disposed cylindrical mixing vessels, each mixing vessel being provided with a substantially vertically disposed inlet tube and a substantially vertically disposed outlet tube, each of said outlet tubes extending from its respective mixing vessel in substantially the same direction and each of said vessels containing at least one loose magnetizable body, the mixing vessels and the outlet tubes having a greater cross-sectional area than the inlet tubes, connections between the vessels consisting of the outlet tube from one vessel being connected to the inlet tube of the next vessel, the mixing vessels being contained in one of the baths and the outlet tubes being contained in the other bath, and said oscillating means comprising a number of permanent magnets arranged on a continuous belt, means for moving said belt alongside the mixing vessels and said permanent magnets being external to but in close proximity to the mixing vessels to move each of the magnetizable bodies in the mixing vessels.

6. An apparatus comprising an oscillating means, two baths, each having means therein for maintaining the bath at a temperature different from the temperature of the other bath, and a number of substantially horizontally disposed, cylindrical mixing vessels, each mixing vessel being provided with a substantially vertically disposed inlet tube and a substantially vertically disposed outlet tube, each of said vessels containing at least one loose magnetizable body, the mixing vessels and the outlet tubes having a greater cross-sectional area than the inlet tubes, each of said outlet tubes extending from its respective mixing vessel in substantially the same direction, connections between the vessels consisting of each of said outlet tubes from one mixing vessel being connected to the inlet tube of the next mixing vessel, the mixing vessels being contained in one of the baths and the outlet tubes being contained in the other bath, and said oscillating means comprising a number of permanent magnets arranged on a continuous belt, means for moving said belt carrying said magnets closely above and across the mixing vessels to move each of the magnetizable bodies in the mixing vessels.

7. An apparatus comprising a conduit and two baths, each having means therein for maintaining the bath at a temperature different from the temperature of the other bath, said conduit containing a plurality of sections which are serially connected, each of said sections consisting essentially of an inlet tube, a mixing vessel, at least one loose magnetizable body, oscillating means and an outlet tube, said mixing vessel being substantially horizontally disposed having a cross-sectional area greater than that of the inlet tube to which it is connected and enveloping the loose body, said loose body being free mass having a cross-sectional area less than that of the mixing vessel and being restricted by said mixing vessel, said outlet tube having a greater cross-sectional area than the inlet tube, and being attached to the mixing vessel; each of said outlet tubes extending from its respective mixing vessel in substantially the same direction, said inlet tube being substantially vertically disposed and said outlet tube being substantially vertically disposed, connections between the vessels consisting of each of the inlet tubes connecting the mixing vessel in one section to the outlet tube of the preceding section and the mixing vessels being contained in one of the baths and the outlet tubes being contained in the other bath and said oscillating means comprising means for providing a periodically changing magnetic field in the vicinity of said loose magnetizable bodies for moving the loose magnetizable body in the mixing vessel.

8. An apparatus comprising an oscillating means, two zones each having means for maintaining the respective zone at a temperature different from the temperature of the other zone and a number of mixing vessels, each vessel being provided with an inlet tube and an outlet tube and containing at least one loose magnetizable body, connections between the vessels consisting of the outlet tube from one vessel being connected to the inlet tube of the next vessel said outlet tube having a greater cross-sectional area than said inlet tube, the mixing vessels being enclosed in one of the zones and the outlet tubes being enclosed in the other zone and said oscillating means comprising means for producing a periodically changing magnetic field in the vicinity of said loose magnetizable bodies for moving the loose magnetizable bodies in the mixing vessels.

References Cited by the Examiner

UNITED STATES PATENTS

| | | | |
|---|---|---|---|
| 833,573 | 10/1906 | Becigneul | 23—272 |
| 1,297,171 | 3/1919 | Holley et al. | 23—270.5 |
| 1,783,203 | 12/1930 | Werkenthin | 196—14.52 |
| 2,038,559 | 4/1936 | Funsten | 23—220.5 |
| 2,710,250 | 6/1955 | Andrews et al. | 23—267 X |
| 2,827,172 | 3/1958 | Frazier | 210—179 X |
| 2,885,432 | 5/1959 | Broich et al. | 23—267 |
| 2,895,808 | 7/1959 | Hartley | 23—270.5 |
| 2,951,689 | 9/1960 | Asp | 259—144 X |
| 3,089,756 | 5/1963 | Tanner | 23—270.5 X |

FOREIGN PATENTS 81,618   4/1953   Norway.

NORMAN YUDKOFF, *Primary Examiner.*

HERBERT L. MARTIN, *Examiner.*